Oct. 27, 1925.　　　　　　　　　　　　　　　　　　1,559,482
J. B. WACHTMAN
WINDSHIELD WIPER
Filed April 17, 1925
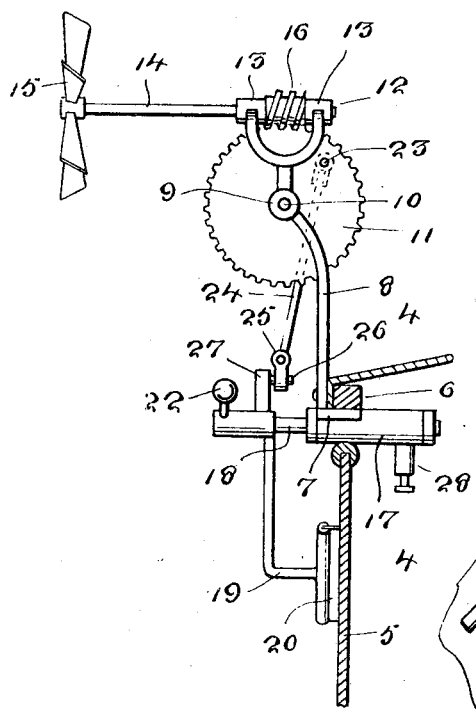
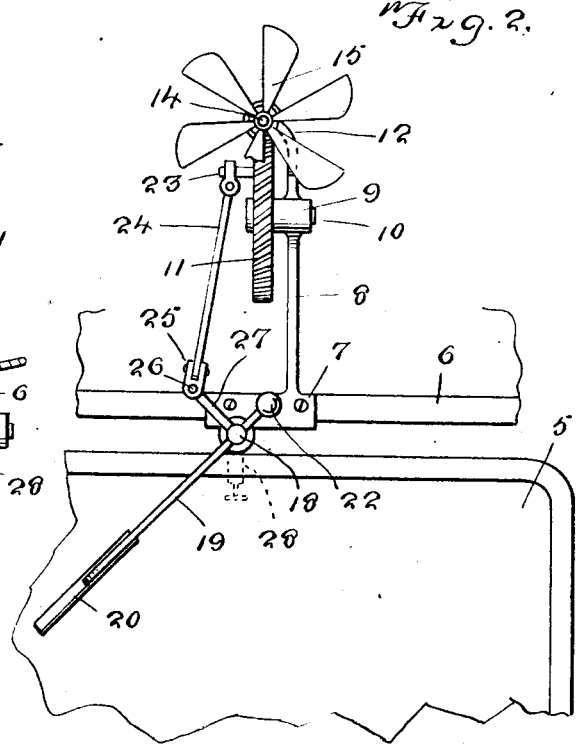
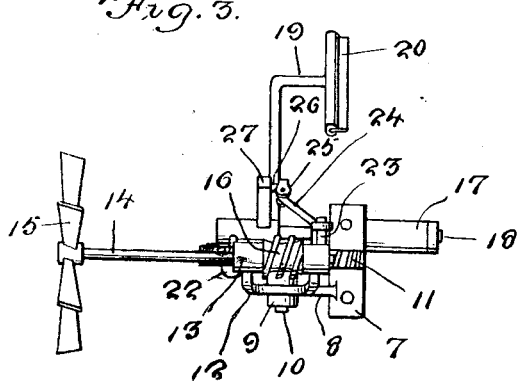
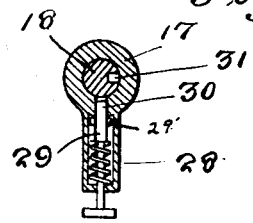
J. B. Wachtman
INVENTOR
BY Victor J. Evans
ATTORNEY
WITNESS:

Patented Oct. 27, 1925.

1,559,482

UNITED STATES PATENT OFFICE.

JOHN BRYAN WACHTMAN, OF CONWAY, SOUTH CAROLINA.

WINDSHIELD WIPER.

Application filed April 17, 1925. Serial No. 23,886.

*To all whom it may concern:*

Be it known that I, JOHN BRYAN WACHTMAN, a citizen of the United States, residing at Conway, in the county of Horry and State of South Carolina, have invented new and useful Improvements in Windshield Wipers, of which the following is a specification.

This invention relates to windshield wipers and its principal object is to provide a windshield wiper which is automatic in operation and which is driven through the instrumentality of a wind rotated wheel supported in a position on an automobile or engine cab in advance of the windshield.

A further object of the invention is to provide an automatic windshield or pilot window wiper embodying an oscillatory wiping element and a wind wheel which is rotated due to the velocity or movement of the automobile.

With the preceding and other objects and advantages in view, the invention consists in the novel combination of elements, construction, arrangement of parts and operations to be hereinafter specifically referred to, claimed and illustrated in the accompanying drawings, wherein:—

Figure 1 is a fragmentary vertical sectional view of parts of an automobile with the invention associated therewith.

Figure 2 is a front elevation of the same.

Figure 3 is an elevation of the device detached from the windshield.

Figure 4 is a sectional view on line 4—4 of Figure 1.

Referring to the drawings in detail wherein corresponding characters of reference denote corresponding parts throughout the several views, the numeral 5 designates the windshield of an automobile and secured to part of the automobile above the windshield as at 6 is a bracket 7 which is formed with an upstanding arm 8. the latter terminating in a horizontally disposed bearing 9. A shaft 10 is journaled on this bearing 9 and fixed to this shaft is a worm wheel 11. Cast with the bearing 9 is a Y-shaped yoke 12 terminating in horizontally alined bearings 13. A shaft 14 carrying at its outer end a wind wheel 15 is journaled in these bearings and is provided with a worm 16 meshing with the worm wheel 11.

Supported by the automobile bracket 7 and cast integral therewith is a horizontally arranged sleeve 17 which extends between the upper edge of the windshield 5 and the stationary part of the automobile 6. The rock shaft 18 is journaled in the sleeve 17 and fixed to the outer end of this shaft 18 is an ordinary arm 19 carrying a squeegee 20 movable over the windshield as shown. A counterbalancing weight 22 is fixed to the shaft 18 and extends laterally therefrom and assists in the smoothness of operation of the oscillatory arm.

A pin 23 extends laterally from one face of the worm wheel 11 and is eccentrically disposed therefrom. A pitman rod 24 is connected with this pin and carries at its lower end the universal connection 25 which is engaged with an outstanding pin 26 formed upon a lug 27, the latter being cast with the rock shaft 18.

From the description thus far given, it follows that upon movement of an automobile, the draught or current of air created thereby strikes the wind wheel and oscillates the wiper or squeegee 20 through the instrumentality of the driving connections above mentioned.

In order to lock the oscillatory arm against oscillation, when not in use, I provide a tubular boss 28 on the sleeve 17 and arrange in this boss a spring pressed plunger 29 movable through a slot 30 in the sleeve 17 and engageable in a recess 31 in the rock shaft 18. This plunger 29 carries a transverse pin 29' that normally engages the sleeve 17 to hold the plunger in inactive position. When it is desired to lock the rock shaft 18 the plunger is given a half turn to permit the pins to pass through the slot 30 and the plunger to engage the recess 31.

While I have shown and described the preferred embodiment of the invention, I desire to have it understood that such changes may be made in the form, construction, arrangement of parts and operations, as will not depart from the spirit of the invention or the scope of the subjoined claims.

What is claimed is:—

1. A device of the character described comprising a sleeve adapted to be mounted horizontally adjacent the windshield of an automobile, a rock shaft journaled therein, a wiping element fixed to the rock shaft and movable over the windshield, an upstanding arm carried by the sleeve, a rotatable element journaled in the arm, bearings formed on the arm, a forwardly extending shaft journaled in the bearings and having operative engagement with the rotatable element, a wind wheel fixed to the shaft, a pitman rod eccentrically connected with the rotatable element and a universal connection between the pitman rod and rock shaft.

2. A device of the character described comprising a sleeve adapted to be mounted horizontally adjacent the windshield of an automobile, a rock shaft journaled therein, a wiping element fixed to the rock shaft and movable over the windshield, an upstanding arm carried by the sleeve, a rotatable element journaled in the arm, bearings formed on the arm, a forwardly extending shaft journaled in the bearings and having operative engagement with the rotatable element, a wind wheel fixed to the shaft, a pitman rod eccentrically connected with the rotatable element and a universal connection between the pitman rod and rock shaft, the sleeve being provided with an opening and the rock shaft being provided with recesses adapted to coincide with the opening, and a spring pressed plunger mounted adjacent the sleeve and adapted to engage the recesses to normally hold the rock shaft inactive.

In testimony whereof I affix my signature.

JOHN BRYAN WACHTMAN.